US00RE45381E

(19) United States
(12) Reissued Patent
Lee et al.

(10) Patent Number: US RE45,381 E
(45) Date of Reissued Patent: Feb. 17, 2015

(54) NETWORK CORRECTION SECURITY SYSTEM AND METHOD

(75) Inventors: Seung-Min Lee, Daejeon (KR); Taek-Yong Nam, Daejeon (KR); Sung-Won Sohn, Daejeon (KR); Chee-Hang Park, Daejeon (KR); Ye Seok Cho, legal representative, Seoul (KR)

(73) Assignee: Electronics and Telecommunications Research Institute, Daejeon (KR)

(21) Appl. No.: 12/954,373

(22) Filed: Nov. 24, 2010

Related U.S. Patent Documents

Reissue of:
(64) Patent No.: 7,457,949
Issued: Nov. 25, 2008
Appl. No.: 10/882,749
Filed: Jun. 30, 2004

(30) Foreign Application Priority Data

Oct. 9, 2003 (KR) ..... 10-2003-0070398

(51) Int. Cl.
*G06F 9/00* (2006.01)

(52) U.S. Cl.
USPC ..... 713/155; 713/168

(58) Field of Classification Search
USPC ..... 726/23
See application file for complete search history.

(56) References Cited

U.S. PATENT DOCUMENTS 5,493,689 A * 2/1996 Waclawsky et al. ..... 710/1
5,781,716 A 7/1998 Hemphill et al.
6,574,605 B1 * 6/2003 Sanders et al. ..... 705/7.26
7,492,713 B1 * 2/2009 Turner et al. ..... 370/231
7,986,625 B2 * 7/2011 Chase et al. ..... 370/231
2003/0033542 A1 * 2/2003 Goseva-Popstojanova et al. ..... 713/201
2004/0093512 A1 * 5/2004 Sample ..... 713/201
2004/0117658 A1 * 6/2004 Klaes ..... 713/201
2004/0148520 A1 * 7/2004 Talpade et al. ..... 713/201

FOREIGN PATENT DOCUMENTS

KR 10-2003-0035181 5/2003
KR 10-2003-0056652 7/2003

OTHER PUBLICATIONS

"Intrusion Tolerance Via Network Layer Controls" by Dick O'Brien, et al., DARPA Information Survivability Conference and Exposition, vol. 1, p. 90-96 (2003).

* cited by examiner

*Primary Examiner* — Michael R Vaughan
(74) *Attorney, Agent, or Firm* — NSIP Law

(57) ABSTRACT

A network correction security system. The network correction security system connected between a network node and a security-related external system, detects attacks on the network node, corrects weak parts of the performance of the network node, collects information for improving the security performance of the network node from a security-related external system, analyzes the information, monitors principal resources of the network node to detect a fault, and removes the fault according to a measure corresponding to a grade of the fault. The network correction security system carries out a recovery process when the fault has not been corrected, and recovers the functions of the network node according to a recovery mechanism when the fault has not been removed after the recovery process.

15 Claims, 4 Drawing Sheets

NETWORK CORRECTION SECURITY SYSTEM AND METHOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED [APPLICATION] *APPLICATIONS*

[This application] *The present patent application is a Reissue of U.S. Pat. No. 7,457,949, issued on Nov. 25, 2008, which* claims priority to and the benefit of [Korea] *Korean* Patent Application No. 2003-70398 filed on Oct. 9, 2003 in the Korean Intellectual Property Office, the entire content of *each of* which [is] *are* incorporated herein by reference.

BACKGROUND OF THE INVENTION (a) Field of the Invention

The present invention relates to a network correction security system and method, and more particularly, to a network correction security system and method for preventing network attacks and correcting attacks that occur to carry out security performance.

(b) Description of the Related Art

Recently, intrusions to or attacks on networks have been rapidly evolved with the popularization of computers and the Internet. The attacks paralyze the networks to result in a severe economical loss caused by, for instance, suspension of electronic commercial transactions and social chaos due to the interruption of providing Internet service.

Accordingly, an intrusion detection system (IDS), one of security systems, has been proposed in order to cope with attacks from hackers. The intrusion detection system requires an improved structure in terms of software and hardware since the attacks from the hackers become more sophisticated and a network bandwidth is rapidly increasing.

A conventional IDS is classified into a host IDS and a network IDS. The host IDS protects a single terminal system such as a server or a personal computer and a network application using an auditing system or even logs. The network IDS monitors network traffic to detect attacks or intrusions of hackers and blocks the attacks or intrusions. The development of the network IDS is concentrated on signature detection, anomaly detection, and detection of denial of service.

However, a conventional security system such as a Firewall and an intrusion prevention system as well as the host IDS and network IDS requires a considerably long period of time to recover a fault generated in a system and normally operate the system. This is because the conventional security system lacks a technique of continuing services the system has been providing by utilizing restricted resources while the system is having a fault or recovering functions of the system.

Furthermore, the conventional security system needs a technique that dynamically improves the system having a fault in cooperation with an external system to prevent the generation of the fault in advance and prevent the same failure from being repeated.

Therefore, there are required a system and method for correctly detecting the type of a network intrusion, which varies rapidly, to recover the performance of a corresponding system having a fault within a short period of time and preventing the same failure from being repeated in the system.

SUMMARY OF THE INVENTION

It is an advantage of the present invention to provide a network correction security system and method for preventing a fault from being generated in a system due to an external attack or intrusion, or a vulnerability of the corresponding system in advance, and when a fault is generated in the system, continuously maintaining the performance of the system using restricted resources while the failure is being recovered.

Furthermore, the present invention provides a network correction security system and method for preventing the same failure from being repeatedly generated through a function of continuously improving the performance of the system.

In one aspect of the present invention, a network correction security system that is connected between a network node and a security-related external system, detects an external attack on the network node, and corrects a weak part of the performance of the network node, comprises a correction agent that removes a fault generated in the network node according to a measure corresponding to a level of the fault to correct the fault, and when it is confirmed that the fault has not been completely corrected, repeats a recovery process of reallocating and dividing resources of the network node; and a correction manager hat continuously collects information required for improving the security performance of the network node from the security-related external system and analyzes the collected information to control the improvement of the security performance of the network node.

The correction manager recovers functions of the network node according to a mechanism that recovers a part of the network node or the entire network node when it is confirmed that the fault has not been completely corrected even after the recovery process has been carried out.

In another aspect of the present invention, a network correction security method that detects an external attack on a network node and corrects a weak part of the performance of the network node comprises a step (a) of removing a fault generated in the network node according to a measure corresponding to a grade of the fault to correct the fault; a step (b) of repeating a recovery process that reallocates and divides resources of the network node when the fault has not been completely corrected in the step (a); a step (c) of recovering functions of the network node according to a mechanism of recovering a part or the entirety of the security performance of the network node when the fault has not been completely corrected even after the recovery process of the step (b); and a step (d) of continuously collecting information required for improving the security performance of the network node from a security-related external system and analyzing the collected information to improve the security performance of the network node.

In another aspect of the present invention, a recording medium including a network correction security method that detects an external attack on a network node and corrects a weak part of the performance of the network node comprises a function of removing a fault generated in the network node according to a measure corresponding to a grade of the fault to correct the fault; a function of repeating a recovery process that reallocates and divides resources of the network node when the fault has not been completely corrected; a function of recovering functions of the network node according to a mechanism of recovering a part or the entirety of the security performance of the network node when the fault has not been completely corrected even after the recovery process; and a function of continuously collecting information required for improving the security performance of the network node from a security-related external system and analyzing the collected information to improve the security performance of the network node.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Figure 1:
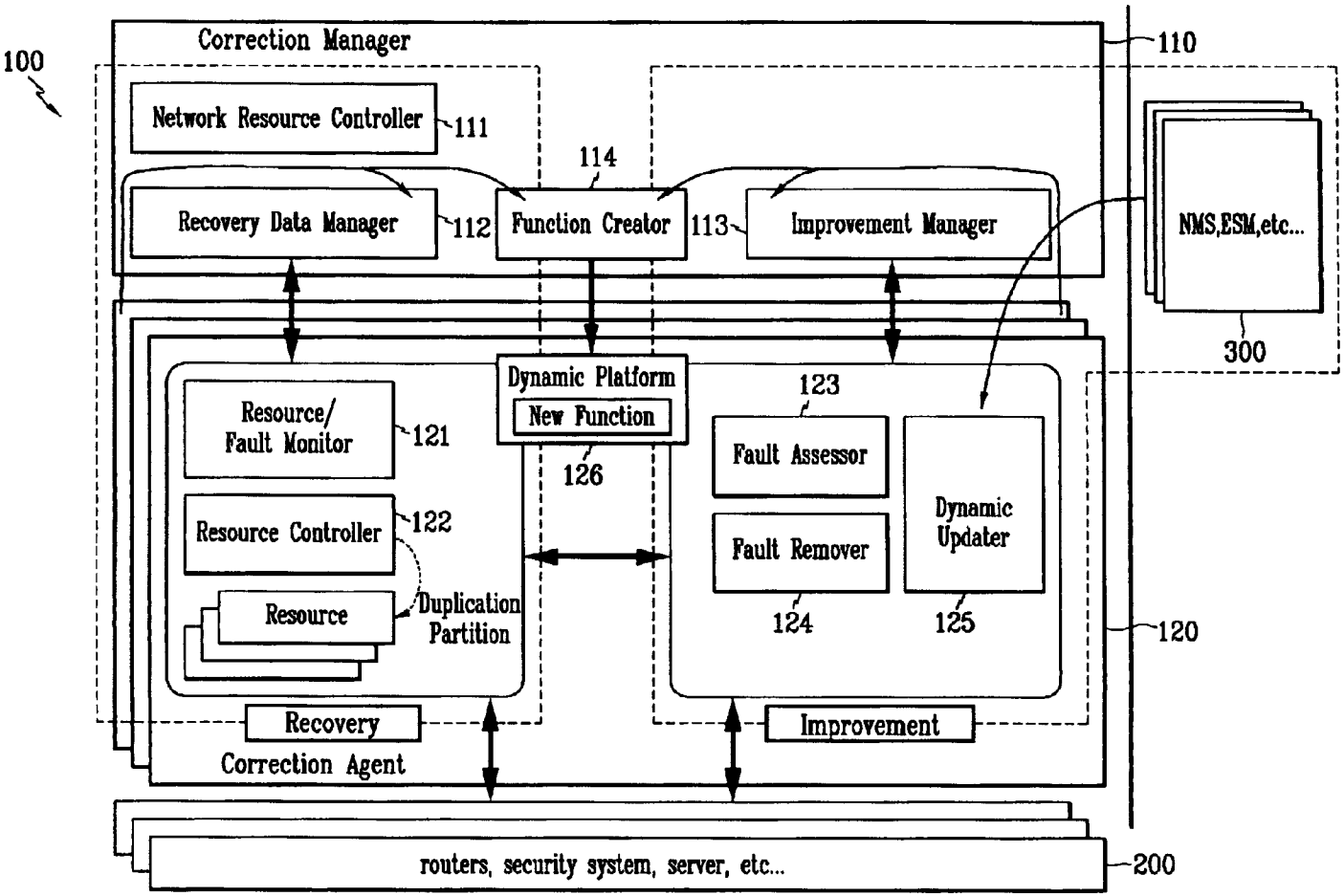
FIG. 1 shows a detailed construction of a network correction security system according an embodiment of the present invention.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Throughout the drawings, like reference numerals refer to like elements.

FIG. 1 shows the construction of a network correction security system according to an embodiment of the present invention. Referring to FIG. 1, the network correction security system 100 includes a single correction manager 110 and at least one correction agent 120. The network correction security system 100 includes a recovery region and an improvement region in terms of function.

The correction agent 120 recovers and improves principal functions of a network node 200, such as a router, a security system, and various security servers, through data transmission/reception to/from the network node 200. The correction agent 120 can be included in a specific device of the network node 200. Otherwise, the correction agent 120 can be constructed as a separate system.

The correction manager 110 includes a network resource controller 111, a recovery data manager 112, an improvement manager 113, and a function creator 114. The correction agent 120 includes a resource/fault monitor 121, a resource controller 122, a fault assessor 123, a fault remover 124, a dynamic updater 125, and a dynamic platform 126.

The components of the network correction system 100 and network recovery and improvement functions thereof will now be explained.

The correction manager 110 has both the recovery and improvement functions. The correction manager 110 manages at least one correction agent 120 and controls the entire correction operation.

The network resource manager 111 of the correction manager 110 manages resources of a corresponding system (hereinafter referred to as "security system"). The network resource manager 111 reallocates the resources of the security system when normal services cannot be provided according to resource allocation in the security system.

Specifically, when it is confirmed that a fault in the security system has not been completely eliminated though the fault has been removed when it was first generated in the security system, the network resource manager 111 grasps the state of resources of another correction agent 120 and performs a secondary fault removal measure (for example, additional resource allocation) according to the grasped state of the resources.

The recovery data manager 112 carries out rapid function recovery through a recovery mechanism (for example, rebooting the security system using stored data or resetting functions of the security system) for a part of the security system or the entire security system when the secondary fault removal measure has not been successfully performed.

The improvement manager 113 receives information about the improvement of the performance of a network from an external system 300 (a network resource system), and executes data mining and correlation analysis for the received information (for example, information about vulnerability of the network) to decide whether the security system is improved.

When the improvement manager 113 judges that the security system requires improvement, the improvement manager 113 provides items to be improved to the correction agent 120 in real time in order to remove causes of a fault before the fault is generated in the security system to prevent the generation of the fault in advance or to prevent the fault from being repeatedly generated.

The function creator 114 creates a new function when it judges that the new function is needed for improving the performance of the security system and provides the created new function to the correction agent 120 which dynamically executes the new function.

The correction agent 120 recovers and improves principal functions of the security system. The resource/fault monitor 121 of the correction agent 120 monitors faults in the security system and availability of principal resources in close relation to the functions of the security system. When a fault is generated in the security system, the resource/fault monitor 121 informs the fault assessor 123 of the generation of the fault.

The resource controller 122 carries out a recovery process including reallocation or division of remaining resources, to secure availability of main components of the security system when the generated fault has not been completely removed though the first recovery measure has been executed after confirmation of the fault.

The fault assessor 123 assesses a grade of the generated fault. The fault remover 124 removes the fault according to a measure corresponding to the assessed grade. In addition, the fault remover 124 prevents the fault from being repeatedly generated.

The fault assessor 123 can request the function creator 114 of the correction manager 110 to create a new function corresponding to the generated fault.

The dynamic updater 125 improves a weak part of the performance of the security system in real time according to the information about the improvement of the performance of the security system, received from the improvement manager 113 of the correction manager 110.

The dynamic platform 126 supports the correction agent 120 to smoothly perform the recovery and improvement functions using at least one new function received from the function creator 114 of the correction manager 110.

The operation of the network correction security system having the aforementioned construction will now be explained with reference to FIG. 2.

Figure 2:
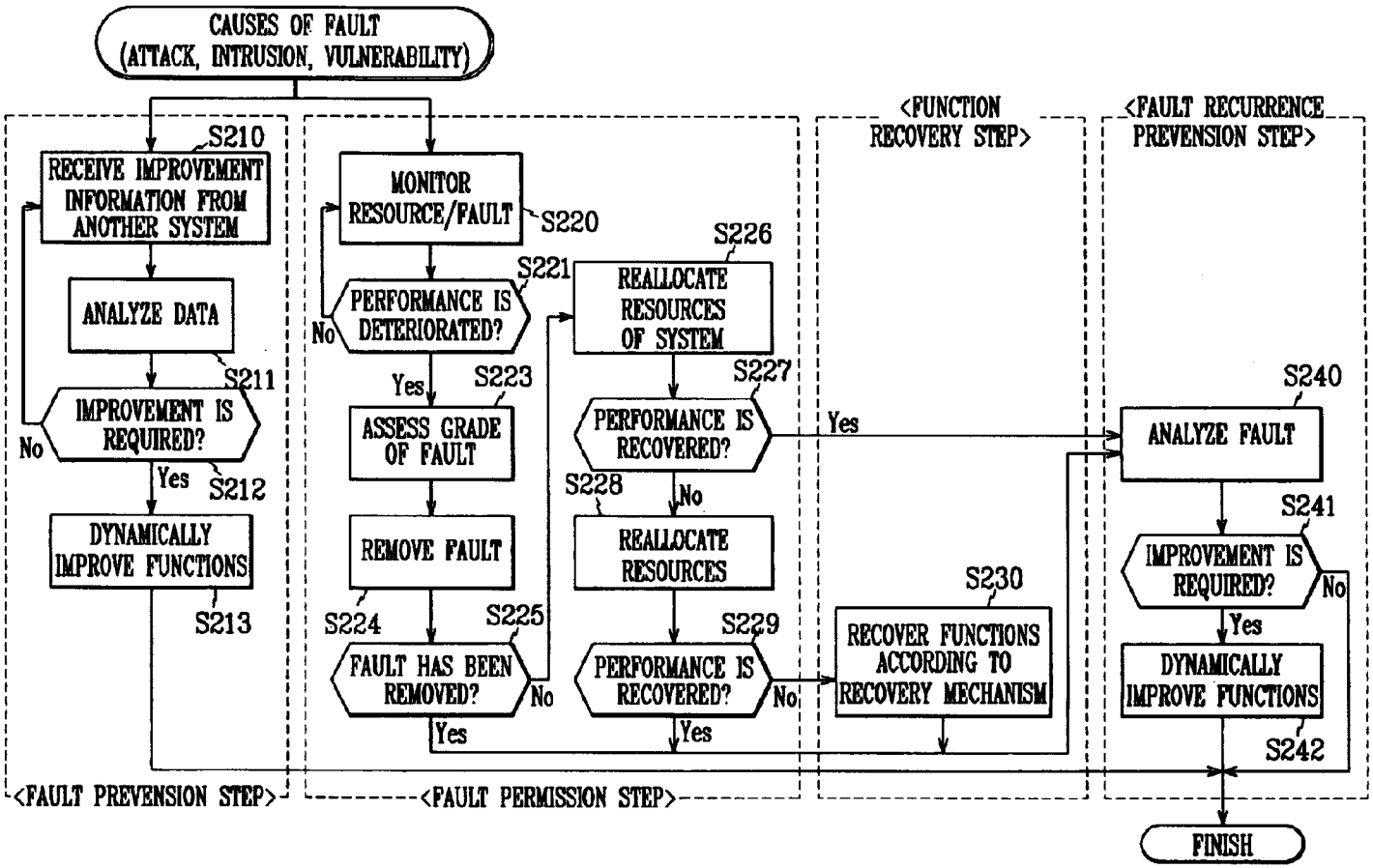
FIG. 2 is a flow chart showing the operation procedure of the network correction security system shown in FIG. 1.

FIG. 2 is a flow chart showing the operation procedure of the network correction security system shown in FIG. 1. Referring to FIG. 2, the network correction security system 100 executes network correction security of the security system through a fault prevention step, a fault permission step, a function recovery step, and a fault recurrence prevention step.

First, in the fault prevention step, the improvement manager 113 of the correction manager 110 receives information required for improving the performance of the security system from the external system 300 in step 210. Then, the improvement manager 113 carries out data mining and correlation analysis for the received information (such as information about vulnerability of a network) in step S211, and then decides whether the performance of the security system needs improvement in step S212.

When it is decided that the performance of the security system needs improvement, the improvement manager 133 transmits the information required for improving the performance of the security system to the dynamic updater 125. The dynamic updater 125 improves a weak part of the performance of the security system in real time as instructed by the improvement manager 113 in step S213.

In the meantime, the resource/fault monitor 121 of the correction agent 120 monitors the performance of the security system when there is a problem in the performance of the security system due to a fault that was not removed in advance, in step S220, and confirms whether the performance of the security system is deteriorated in step S221. When it is confirmed that the performance of the security system is deteriorated, the resource/fault monitor 121 immediately informs the fault assessor 123 thereof. Then, the fault assessor 123 assesses a grade of the fault in step S223, and the fault remover 124 removes the fault in step S224.

When it is confirmed that the fault has not been completely removed after the aforementioned first fault removal measure, in step S225, the resource controller 122 reallocates and divides internal resources of the security system in step S226, thereby maintaining the normal performance of the security system.

When the performance of the security system is determined not to be recovered even through the secondary measure, in step S227, the network resource manager 111 grasps the state of the resources of the correction agent 120 and performs a third network-based fault removing measure (for example, additional resource allocation) according to the grasped resources, in step S228.

In the function recovery step, when the security system is not properly operated even when the aforementioned measures has been executed, the recovery data manager 112 rapidly recovers functions of the security system by executing a recovery algorithm (for example, rebooting the system or storing data required for resetting the functions of the system) in step S230.

Next, in the fault recurrence prevention step, the improvement manager 113 of the correction manager 110 analyzes at least one fault that was generated in the security system, in step S240. When it is judged that the security system requires improvement from the analysis result, the improvement manager 113 transmits information about the improvement of the security system to the dynamic updater 125 to improve a weak part of the performance of the security system in real time, in step S242.

As described above, the network correction security system and method of the present invention prevents the generation of a fault due to an external attack on or intrusion to the security system, or a vulnerability of the security system, in advance. Furthermore, the present invention continuously maintains the performance of the security system using restricted resources while the fault generated in the security system is being recovered.

Moreover, the present invention prevents the same fault from being repeatedly generated in the security system through a function of continuously improving the performance of the security system.

Figure 3:
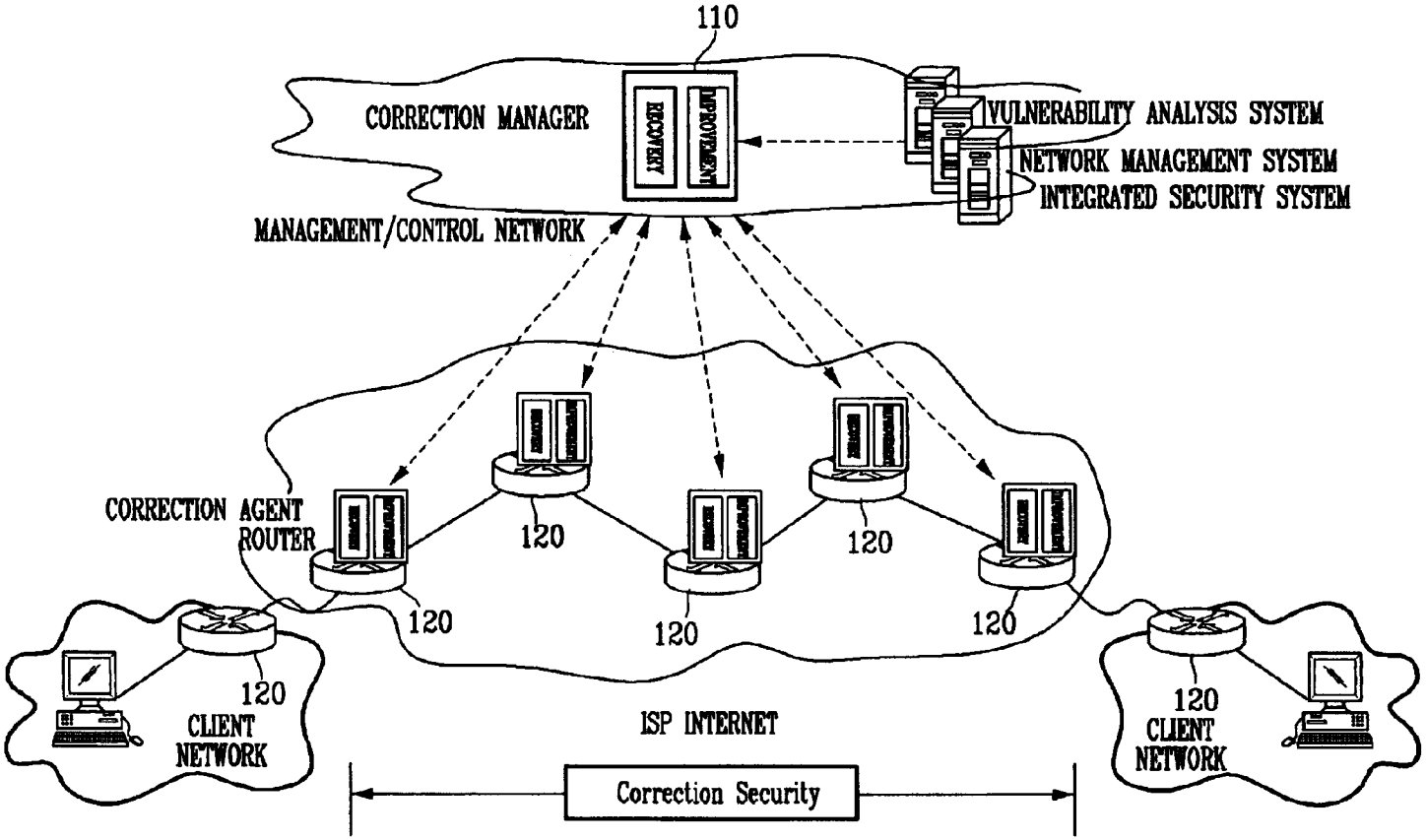
FIG. 3 shows the construction of an ISP network to which the network correction security system of FIG. 1 is applied.

Next, an Internet service provider (ISP) network, one of communication networks to which the network correction security system is applied, is explained with reference to FIG. 3. FIG. 3 shows the construction of the ISP network to which the network correction security system shown in FIG. 1 is applied.

Referring to FIG. 3, the correction manager 110 is located on a management/control network and cooperates with a vulnerability analysis system, a network management system, and an integrated security system. At least one correction agent 120 is located in each router, or if required, exists in the form of a dedicated agent.

If a DDoS (Distributed Denial of Service) attack that menaces the security of the network to paralyze the network is generated, the improvement manager 113 of the correction manager 110 receives an indication of the DDoS attack from the vulnerability analysis system, network management system, and integrated security management system, and then transmits the information about the indication to the dynamic updater 125 of the correction agent 120. Then, the dynamic updater 125 dynamically operates a function of discarding a DDoS packet to prevent the generation of a fault in advance.

However, when a router passes the fault prevention step and is exposed to causes of a fault, the capacity of a memory that is an important resource required for processing of the router is consumed so that the processing performance of the router may be deteriorated. The resource/fault monitor 121 informs the fault assessor 123 of information about a generated fault. The fault assessor 123 assesses a grade of the fault, and the fault remover 124 carries out the fault permission step through a fault removal function of discarding the DDoS packet that is a cause of the fault.

When the router does not normally operate although the aforementioned fault removal process has been carried out, the resource controller 122 reallocates a memory capacity required for executing the processing in the router. Furthermore, the network resource manager 111 changes a path of some packets to a neighboring router to control a router processing load.

When a fault is generated in the router so that the router does not normally operate although the above-described fault permission step has been executed, the recovery data manager 112 executes a recovery mechanism (for example, rebooting the system or storing data required for resetting functions of the system) using optimum setting information of the router to rapidly recover functions of the system.

The improvement manager 113 transmits information about the improvement of the system to the dynamic updater 125 to improve a weak part of the performance of the system in real time.

Figure 4:
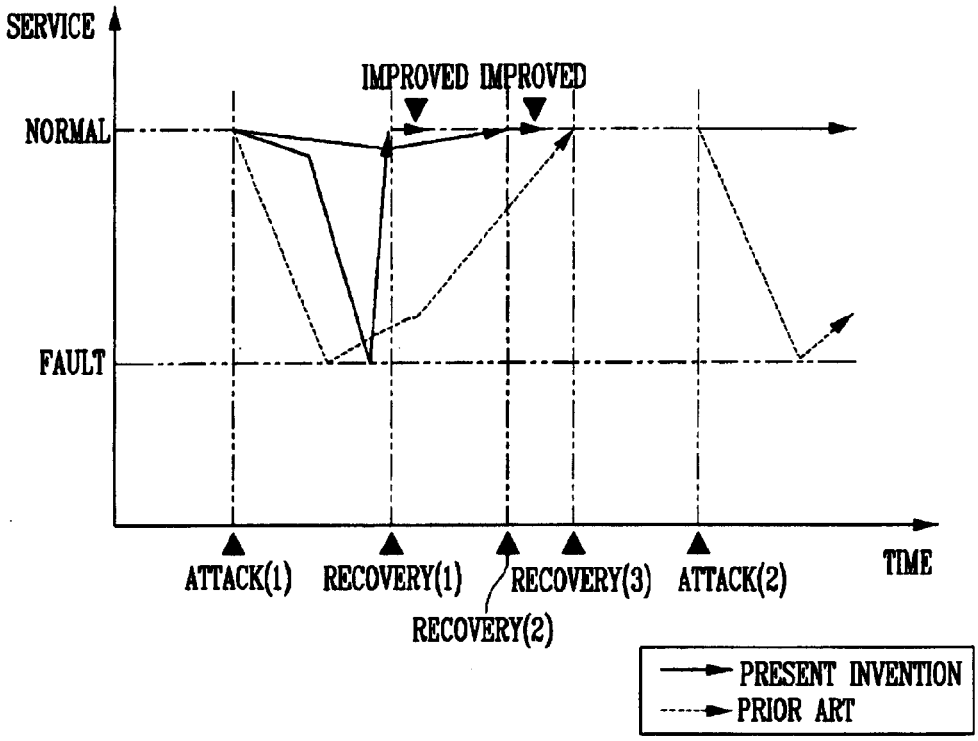
FIG. 4 is a graph showing the result of execution of the security performance of the network correction security system of FIG. 1.

FIG. 4 is a graph showing the correction result of the network correction security system shown in FIG. 1.

From FIG. 4, it can be known that the network correction security system of the present invention (indicated by a solid line) has performed function recovery within a short period of time, compared to a conventional security system (represented by a dotted line).

Moreover, the present invention can continuously provide normal services through networks even in unfavorable conditions having external attacks or intrusions.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

The network correction security system and method according to the present invention can prevent the generation of a fault due to an external attack or intrusion, or a vulnerability of a corresponding system. Furthermore, the present invention can continuously maintain the performance of the corresponding system using restricted resources while the fault generated in the system is being recovered. Moreover, the present invention prevents the same fault from being repeatedly generated through a function of continuously improving the performance of the system.

What is claimed is:

1. A network correction security system that is connected between a [network node] *router* and a security-related external system, detects an external attack on the [network node] *router*, and corrects a [weak part of the performance] *vulnerability* of the [network node] *router*, comprising:

a correction agent [that removes] *processor connected to the router, wherein the correction agent processor is configured to remove* a fault generated in the [network node] *router* according to a measure corresponding to a level of the fault to correct the fault, and when it is confirmed that the fault has not been completely corrected, [repeats] *repeat* a recovery process of reallocating and dividing resources of the [network node] *router*; and a correction manager [that] *processor connected to the correction agent processor and the security-related external system, wherein the correction manager processor is configured to* continuously [collects] *collect* information for improving [the] *a* security performance of the [network node] *router* from the security-related external system [and analyzes], *analyze* the collected information to control the improvement of the security performance of the [network node] *router, and in response to the analyzing of the collected information, allocate additional resources from another network excluding the router to improve the security of the router while the fault is being recovered, wherein*

*the correction manager processor recovers functions of the router and corrects the vulnerability of the router, which vulnerability is subject to an external attack, based on the information for improving the security performance of the router that is received from the security-related external system.*

2. The network correction security system as claimed in claim 1, wherein the correction manager *processor* recovers functions of the [network node] *router* according to a mechanism that recovers a part of the [network node] *router* or the entire [network node] *router* when it is confirmed that the fault has not been completely corrected after the recovery process has been carried out.

[3. The network correction security system as claimed in claim 2, wherein the correction manager improves a weak part of the performance of the network node, which is vulnerable to an external attack and is detected when the functions of the network node are recovered, based on the information for improving the security performance of the network node that is received from the security-related external system.]

4. The network correction security system as claimed in claim 1, wherein the correction agent *processor* comprises:

a resource/fault monitor that monitors availability of principal resources of the [network node] *router* to detect whether a fault is generated in the [network node] *router*;

a fault assessor that assesses a grade of a fault detected by the resource/fault monitor; and a fault remover that removes the fault according to a measure corresponding to the assessed grade to correct the fault.

5. The network correction security system as claimed in claim 4, wherein the correction agent *processor* further comprises a resource controller that carries out a recovery process of reallocating and dividing the resources of the [network node] *router* when it is confirmed that the corrected fault has not been completely removed.

6. The network correction security system as claimed in claim 5, wherein the correction manager *processor* comprises:

a network resource manager that grasps the state of the resources of the [network node] *router* when it is confirmed that the generated fault has not been completely removed after the resource controller has carried out the recovery process; and a recovery data manager that carries out a recovery process including additionally allocating and dividing the resources of the network according to the grasped state of the resources.

7. The network correction security system as claimed in claim 6, wherein the recovery data manager recovers the functions of the [network node] *router* according to a recovery mechanism including reconstructing, resetting, and rebooting a specific system of the [network node] *router* when it is confirmed that the fault has not been completely removed through the recovery process of the resource controller.

8. The network correction security system as claimed in claim 6, wherein the correction manager *processor* further comprises a function creator that creates at least one new function that improves a part or the entirety of the security performance of the [network node] *router* and provides the new function to the correction agent *processor*.

9. A network correction security method that detects an external attack on a [network node] *router* and corrects a [weak part of the performance] *vulnerability* of the [network node] *router*, comprising:

(a) removing a fault generated in the [network node] *router* according to a measure corresponding to a grade of the fault to correct the fault;

(b) repeating a recovery process that reallocates and divides resources of the [network node] *router* when the fault has not been completely corrected in (a);

(c) recovering functions of the [network node] *router* according to a mechanism of recovering a part or the entirety of [the] *a* security performance of the [network node] *router* when the fault has not been completely corrected after the recovery process of (b); and (d) continuously collecting information for improving the security performance of the [network node] *router* from a security-related external system [and], analyzing the collected information to improve the security performance of the [network node] *router, and in response to the analyzing of the collected information, allocating additional resources from another network excluding*

*the router to improve the security of the router while the fault is being recovered, wherein*

(*d*) *includes recovering functions of the router and correcting the vulnerability of the router, which vulnerability is subject to an external attack, based on the information for improving the security performance of the router received from the security-related external system.*

[10. The network correction security method as claimed in claim 9, wherein (d) includes improving a weak part of the performance of the network node, which is vulnerable to an external attack and is detected when the functions of the network node are recovered, based on the information for improving the security performance of the network node received from the security-related external system.]

11. The network correction security method as claimed in claim 9, wherein (a) comprises:

monitoring availability of principal resources of the [network node] *router*;

detecting whether a fault is generated in the [network node] *router* according to the result of the monitoring step;

assessing a grade of at least one fault detected; and removing the fault according to a measure corresponding to the assessed grade.

12. The network correction security method as claimed in claim 9, wherein (b) comprises:

confirming whether the fault has been completely removed;

grasping the state of the resources of the [network node] *router* when it is confirmed that the fault has not been completely removed; and carrying out a recovery process including additionally allocating and dividing the resources of the [network node] *router* according to the grasped state of the resources.

13. The network correction security method as claimed in claim 9, wherein (c) comprises:

confirming whether the fault has been completely corrected after the security performance of the [network node] *router* has been recovered;

grasping the state of the resources of the [network node] *router* again when the fault has not been completely corrected;

carrying out a recovery process including additionally allocating and dividing the resources of the [network node] *router* according to the grasped state of the resources; and recovering the functions of the [network node] *router* according to a recovery mechanism of rebooting a specific system of the [network node] *router* when the fault has not been completely corrected even after the recovery process.

14. The network correction security method as claimed in claim 9, wherein (d) comprises:

analyzing data mining and correlation of the collected information for improving the security performance of the [network node] *router*: and determining whether the performance of the [network node] *router* is improved according to the result of the analysis.

15. A *non-transitory computer-readable* recording medium including [a network correction security method that detects] *instructions that when executed by a computer detect* an external attack on a [network node] *router* and [corrects a weak part of the performance] *correct a vulnerability* of the [network node] *router*, the [network correction security method] *instructions* comprising:

removing a fault generated in the [network node] *router* according to a measure corresponding to a grade of the fault to correct the fault;

repeating a recovery process that reallocates and divides resources of the [network node] *router* when the fault has not been completely corrected;

recovering functions of the [network node] *router* according to a mechanism of recovering a part or the entirety of [the] *a* security performance of the [network node] *router* when the fault has not been completely corrected even after the recovery process; and continuously collecting information required for improving the security performance of the [network node] *router* from a security-related external system [and], analyzing the collected information to improve the security performance of the [network node] *router and, in response to the analyzing of the collected information, allocating additional resources from another network excluding the router to improve the security of the router while the fault is being recovered*, wherein the recording medium is readable by a computer having a program installed therein, *wherein*

*improving the security performance of the router includes recovering functions of the router and correcting the vulnerability of the router, which vulnerability is subject to an external attack, based on the information for improving the security performance of the router received from the security-related external system.*

*16. The network correction security system of claim 1, wherein the correction manager processor is configured to allocate other routers excluding the router connected to the correction agent process to provide additional resources.*

*17. The network correction security system of claim 1, wherein the correction manager processor is configured to allocate additional resources through a network monitoring system (NMS) or an external security manager (ESM).*

* * * * *